Figure 1:
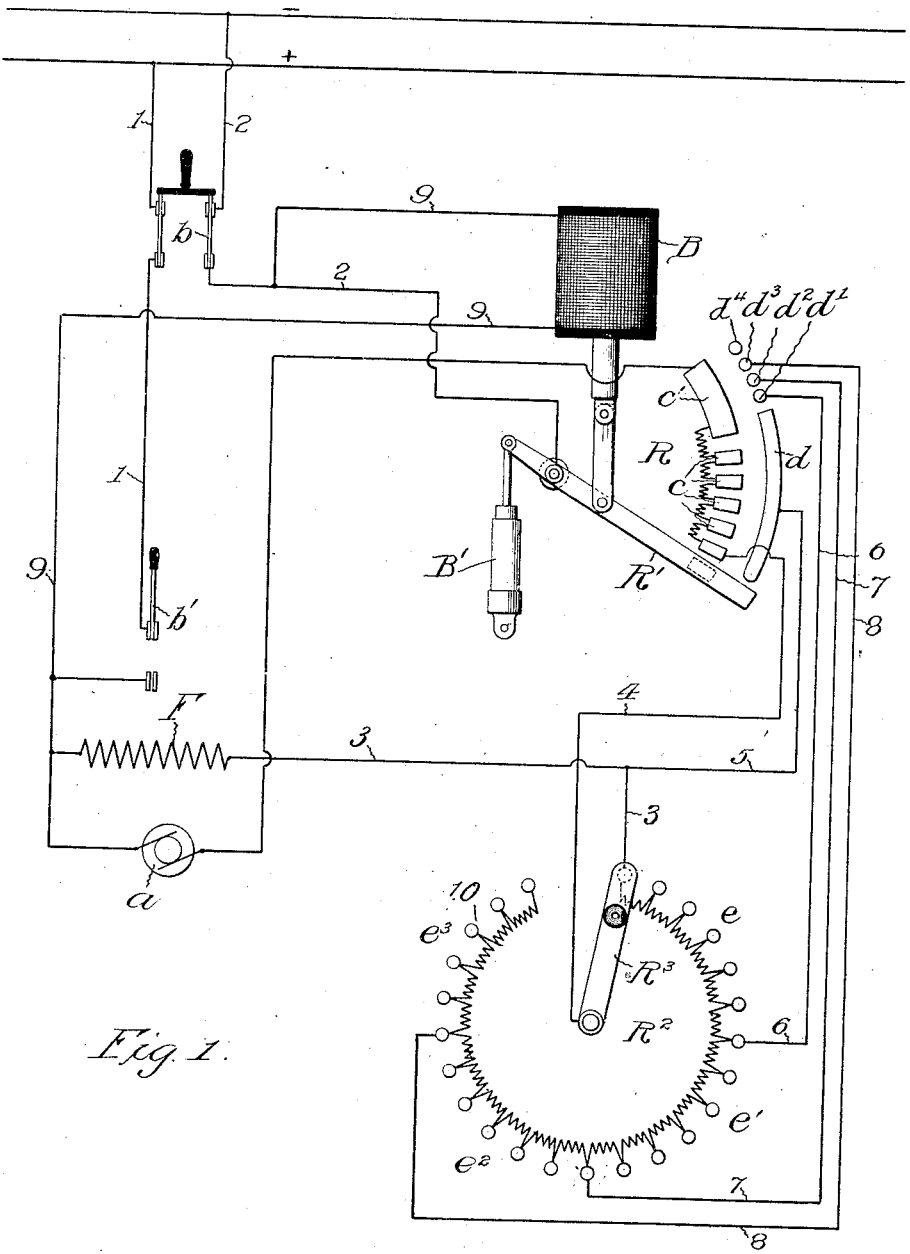

No. 826,318. PATENTED JULY 17, 1906.
A. D. DU BOIS.
SPEED CONTROL SYSTEM FOR ELECTRIC MOTORS.
APPLICATION FILED APR. 8, 1905.

2 SHEETS—SHEET 1.

Witnesses:
N. N. Leach
Irving Mac Donald

Inventor:
Alexander D. Du Bois,
By Barton Tanner
Attys.

No. 826,318. PATENTED JULY 17, 1906.
A. D. DU BOIS.
SPEED CONTROL SYSTEM FOR ELECTRIC MOTORS.
APPLICATION FILED APR. 8, 1905.

2 SHEETS—SHEET 2.

Witnesses:
W. W. Leach
Irving Mac Donald.

Inventor:
Alexander D. Du Bois,
By Barton Tanner
Attys.

UNITED STATES PATENT OFFICE.

ALEXANDER D. DU BOIS, OF CHICAGO, ILLINOIS, ASSIGNOR TO WESTERN ELECTRIC COMPANY, OF CHICAGO, ILLINOIS, A CORPORATION OF ILLINOIS.

SPEED-CONTROL SYSTEM FOR ELECTRIC MOTORS.

No. 826,318.  Specification of Letters Patent.  Patented July 17, 1906.

Application filed April 8, 1905. Serial No. 254,451.

*To all whom it may concern:*

Be it known that I, ALEXANDER D. DU BOIS, a citizen of the United States, residing at Chicago, in the county of Cook and State of Illinois, have invented a certain new and useful Improvement in Speed-Control Systems for Electric Motors, of which the following is a full, clear, concise, and exact description.

My invention relates to speed-control systems for electric motors of the type wherein variations of the field strength are utilized to vary the motor speed.

The invention has for its object to provide an arrangement whereby the desired amount of field resistance to be inserted in the field-circuit through the agency of the motor-starting switch may be adjusted or fixed independently of said starting-switch.

It is generally known by all persons familiar with the art that a motor may have its speed increased by the insertion and decreased by the withdrawal of resistance in the field-circuit and that a motor should have its full field strength at the time of starting and during the initial acceleration in order that it may have its maximum torque when most needed and may be prevented from sparking, which occurs when the field is weak. It is very desirable that electric motors governed in this way, which are used for driving machines requiring variations in their speed for different classes of work—such, for example, as lathes, boring-mills, shapers, &c.—shall be equipped so that they may be frequently stopped for examining or measuring the work or for setting new work and may be again started and brought automatically to the same speed at which they were previously running without requiring the operator each time to adjust the field resistance to obtain the speed at which the motor was running before it was stopped. Furthermore, it is often desirable in certain classes of work to vary the speed of the motor while running by altering the adjustment of the field resistance without disturbing the starting switch or arm.

In accordance with my invention I employ a starting-rheostat comprising an armature starting resistance with its controlling-arm, together with a field resistance having a variable maximum value and capable of adjustment independent of the arm controlling the starting resistance for determining the amount of field resistance to be inserted in the field-circuit in order to bring the motor up to the desired speed. I employ this same starting-arm to insert the predetermined field resistance into the field-circuit after the armature resistance has been cut out. In my system, therefore, when it is desired to run the motor at a certain speed for a particular class of work, it is only necessary to set or adjust the field resistance for that speed—that is, give it a maximum value which can be inserted in the field-circuit by the starting-arm—and the motor may be started and stopped and brought up to the speed for which the field resistance is set by simply operating the starting-arm without changing or interfering with the adjustment of the field resistance.

I will describe my invention by reference to the accompanying drawings, wherein—

Figure 2:
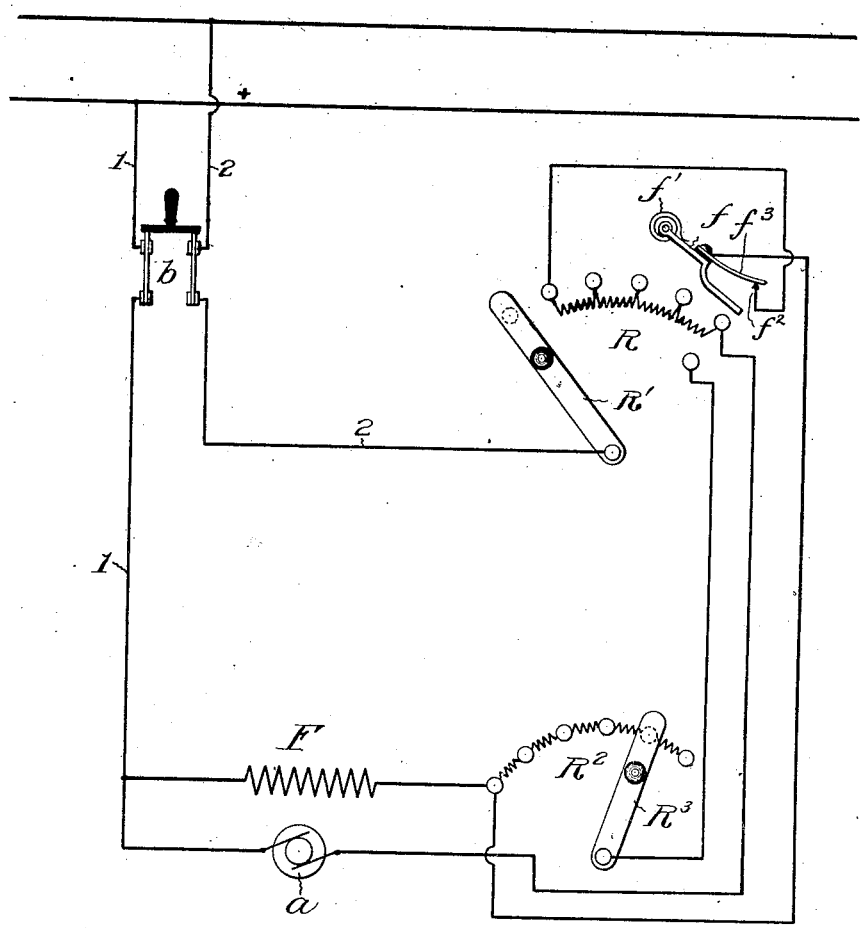

Figure 1 is a circuit diagram illustrating the preferred form of my invention, and Fig. 2 is a diagram of another form thereof.

The same characters of reference designate the same parts wherever they are shown.

Referring first to Fig. 1, the armature $a$ of the motor is included in a bridge 1 2 of the line-circuit, said bridge being controlled by the main switch $b$ and an auxiliary switch $b'$. A starting resistance R is provided for the armature-circuit and comprises a series of contact-terminals $c$ $c'$, connected by resistance, and a controlling lever or arm R', adapted to sweep over said terminals. The final terminal $c'$ is connected with one pole of the armature, and the controlling-arm R' is connected with the portion of the conductor 2 leading to the line in the usual manner.

A field resistance $R^2$ is associated with the motor, having a controlling arm or handle $R^3$. The field-winding F of the motor is included in a conductor 3, leading from a conductor 1, between the auxiliary switch $b'$ and the armature $a$, to the first terminal contact of the field-resistance $R^2$, the controlling-handle $R^3$ thereof being connected by conductor 4 with the first contact-terminal of the armature-resistance, so that when the starting-arm is in contact with the first or any terminal of said armature resistance the field-winding is in a bridge 3 4 of conductors 1 2.

The controlling-arm R³ of the field resistance is adapted to be moved to vary the maximum value of the field resistance or to determine the amount thereof to be associated with the field-circuit in order to bring the motor to the desired speed, the arm R³ being at all times independent of the starting-arm R'.

The starting-arm R' is arranged to control the interpolation into the field-circuit of the predetermined maximum field resistance and is accordingly adapted in its movement after cutting out the armature resistance to control shunts about portions or sections of the predetermined maximum field resistance to bring the same gradually into the field-circuit. A number of contact-terminals $d\ d'\ d^2\ d^3$ are provided, adapted to be successively engaged by the starting-arm, the terminal $d$ being adapted to be engaged by the arm R' before or at the instant it touches the first terminal $c$ of the armature resistance and until it comes into contact with the final terminal $c'$, when all the armature resistance is cut out. The contact $d$ is connected by a conductor 5 with the first contact-terminal of the field resistance, so that while the starting-arm is in engagement with contact or segment $d$ the entire field resistance, no matter what may be the position of its arm R³, is short-circuited. The contacts $d'\ d^2\ d^3$ are connected by conductors 6 7 8, respectively, with different portions of the field resistance, so that the same is divided up into sections $e\ e'\ e^2\ e^3$. Thus, assuming the arm R³ of the field resistance to be set at point 10 of section $e^3$ after the starting-arm has traversed its contacts $c$ to cut out armature resistance and has reached its final contact $c'$, it leaves the auxiliary contact or segment $d$ and engages the next auxiliary contact $d'$, opening the shunt 5 to include the section $e$ in the field-circuit and completing a shunt 6 about the remaining sections. As the arm continues its movement it opens shunt 6 and closes and opens shunt 7 8 about the other portions or sections of the field resistance until the predetermined amount thereof is included in the field-circuit.

I preferably provide a solenoid B for moving the controlling-arm R' over the starting resistance, said solenoid being included in a bridge 9 of conductors 1 2, adapted to be closed by the auxiliary switch $b'$. The arm R' may be provided with the usual dash-pot B'.

The starting resistance and its controlling-arm, together with the field resistance and its independent controlling-lever, constitute the motor-starting rheostat.

The operation of the system illustrated in Fig. 1 is as follows: The attendant, desiring to run the motor at a speed suitable for a particular class of work, after having started the motor in the ordinary way by closing switches $b\ b'$ adjusts the field resistance for this speed by turning the controlling-handle R³ thereof to the proper point—for example, to section $e^3$—to bring the correct amount of resistance into the field-circuit, or, in other words, to fix the maximum field-resistance value which the starting-arm controls. He then in a subsequent starting of his motor would only need to close the main switch $b$ and auxiliary switch $b'$, completing a circuit for the solenoid, which draws the controlling-arm R' of the armature starting resistance slowly over its associated contacts, gradually cutting out said armature resistance. As long as the controlling-arm is in contact with the segment $d$ the field resistance is short-circuited by conductor 5, allowing the motor to start with full field strength; but as soon as the armature resistance is cut out the controlling-arm R' leaves the segment $d$ and engages contact $d'$, opening the short circuit 5 about the field resistance and including the portion or section $e$ of the field resistance in the field-circuit. The arm while in engagement with the contact $d'$ short-circuits the remaining sections of the field resistance. As the arm continues it opens the short circuit last closed and includes the sections $e\ e'$ in the field-circuit, short-circuiting the remainder, until when it reaches the end of its journey it has included the entire field resistance in the field-circuit. The field resistance and its adjusting handle or arm being independent of the starting resistance and its controlling-arm, the motor may now be stopped and afterward brought up to speed as often as desired by simply operating the starting-arm without interfering with the arm R³ and varying the adjustment of the field resistance. In case it be desired to vary the speed of the motor while the same is running it would simply be necessary to operate the arm R³ of the field resistance without in any way disturbing the motor-starting switch or lever R'.

The system shown in Fig. 2 illustrates a modified form of the invention wherein the predetermined maximum field resistance is inserted at a single step in the field-circuit immediately upon the removal of the starting resistance from the armature-circuit. To this end I provide an arm $f$, normally maintained by a spring $f'$ in position to force an insulated contact-arm $f^3$, carried thereby, into engagement with a terminal $f^2$ to close a short circuit about the predetermined maximum field resistance. The arm $f$ is adapted to be engaged by the starting-lever R' after it has cut the starting resistance out and moved to force its contact-arm $f^3$ away from its anvil to open the short circuit. When the controlling-lever R' is returned to normal position, the arm $f$ returns under the influence of spring $f''$ to reëstablish the connection of arm $f^3$ with its anvil to reëstablish the short circuit. The controlling-arm may, as in this form of this invention, be an ordinary manual switch member.

It will be noted that with my system it is impossible to start the motor on a weakened field, since when the motor is started the short circuit of the field resistance is always closed.

I claim—

1. In a speed-control system for electric motors, the combination with a motor, of an armature starting resistance for the motor, a controlling-arm for said resistance, a field resistance for the motor having a variable maximum value, means for adjusting the maximum value of said resistance independent of the starting resistance arm, and means controlled by said arm for bringing the predeterminted maximum field resistance into the field-circuit.

2. In a system of motor control, the combination with a motor, of a starting resistance therefor with its controlling-arm, a field resistance, means independent of said controlling-arm for determining the amount of field resistance to be associated with the motor-field, and means controlled in the movement of said controlling-arm for gradually bringing the predetermined resistance into the field-circuit, after the armature resistance is cut out.

3. In a system of motor control, the combination with a motor, and a starting-rheostat for the motor comprising a starting resistance with its controlling or starting arm, a field resistance, a controlling-arm therefor adapted to be moved independently of the starting-arm to vary the maximum value of the field resistance, and means, controlled by said starting-arm after the starting resistance is cut out thereby, to bring into the field-circuit the predetermined field resistance.

4. In a speed-control system for electric motors, the combination with a motor and a circuit therefor, of a starting resistance for the armature-circuit of said motor, an arm for said resistance adapted when moved to cut the same out of the armature-circuit, a field resistance for the motor, a contact-arm independent of said starting-arm, adapted to be moved along the field resistance to determine the amount of said resistance to be associated with the motor-field, and a short circuit of the field resistance completed by the said starting-arm, said short circuit being broken after said arm cuts out the armature resistance to bring the motor to the desired, speed; whereby the motor is allowed to start with full field strength and after reaching the desired speed, may be stopped and automatically brought to the same speed by operating said starting-arm, without interfering with the field-resistance controlling-arm.

5. In a speed-control system for electric motors, the combination with a motor and its circuit, and a starting-rheostat therefor comprising a starting resistance and a lever-arm therefor adapted to cut the same gradually out of circuit, a field resistance, and a contact-arm therefor adapted to be moved to determine the amount of field resistance to be inserted in the field-circuit, said arm being at all times independent of the starting resistance arm, and shunts about different portions or sections of the field resistance controlled by the starting-arm in its movement, to bring the predetermined field-resistance gradually into the field-circuit after the armature resistance is cut out.

6. In a speed-control system for electric motors, the combination with a motor and its circuit, of a starting resistance therefor and its controlling-arm, electromagnetic means for moving said arm to control said resistance, a field resistance, means independent of the starting-resistance controlling-arm for determining the amount of field resistance to be used, and means controlled by said starting-arm, after the armature resistance is cut out, adapted to bring the predetermined field resistance into the field-circuit.

In witness whereof I hereunto subscribe my name this 18th day of January, A. D. 1905.

ALEXANDER D. DU BOIS.

Witnesses:
 FREDERICK P. McINTOSH,
 E. F. BEAUBIEN.